United States Patent
Nakano

(10) Patent No.: US 7,748,075 B2
(45) Date of Patent: Jul. 6, 2010

(54) WIPER SYSTEM WITH WASH AND WIPE MODE

(75) Inventor: Hiroyuki Nakano, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 355 days.

(21) Appl. No.: 11/889,802

(22) Filed: Aug. 16, 2007

(65) Prior Publication Data

US 2008/0060677 A1 Mar. 13, 2008

(30) Foreign Application Priority Data

Sep. 12, 2006 (JP) .............................. 2006-246842

(51) Int. Cl.
*B60S 1/46* (2006.01)
(52) U.S. Cl. ........... 15/250.02; 239/284.1; 318/DIG. 2; 318/443; 318/444
(58) Field of Classification Search .............. 15/250.02, 15/250.01, 250.001; 318/443, 444, 461, 318/DIG. 2; 239/284.1
See application file for complete search history.

(56) References Cited

U.S. PATENT DOCUMENTS 4,720,664 A * 1/1988 Iwamoto et al. ............. 318/444
5,811,950 A * 9/1998 Lawson ...................... 318/484

FOREIGN PATENT DOCUMENTS

JP A-05-319213 3/2003

* cited by examiner

*Primary Examiner*—Gary K Graham
(74) *Attorney, Agent, or Firm*—Posz Law Group, PLC

(57) ABSTRACT

In a low speed wiping mode, reciprocal wiping movement of a wiper is executed at a first wiping speed without spraying the washer fluid from washer nozzles. In a high speed wiping mode, reciprocal wiping movement of the wiper is executed at a second wiping speed that is higher than the first wiping speed without spraying the washer fluid from the washer nozzles. In a wash and wipe mode, washer fluid is sprayed from the washer nozzles over the windshield, and reciprocal wiping movement of the wiper is executed a plurality of times. A wiping speed of the wiper in the wash and wipe mode in at least one of a running state and a stopped state of the vehicle is set to be lower than the first wiping speed of the wiper that is set for the low speed wiping mode.

9 Claims, 2 Drawing Sheets

FIG. 2A  FIG. 2B  FIG. 2C
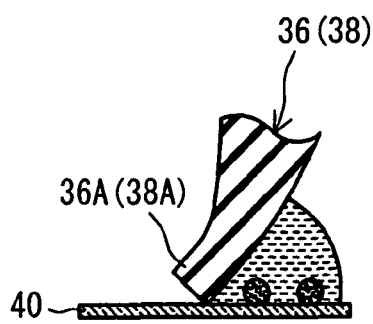
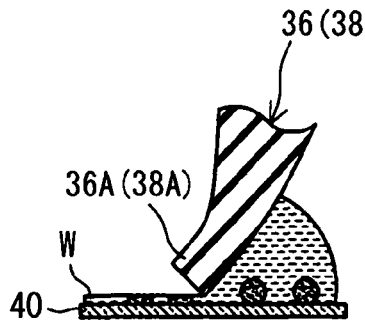
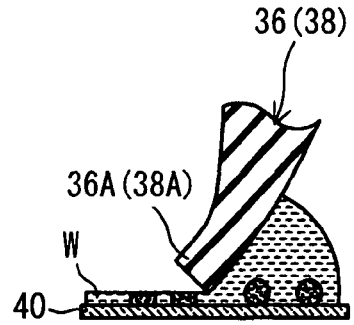
FIG. 2D
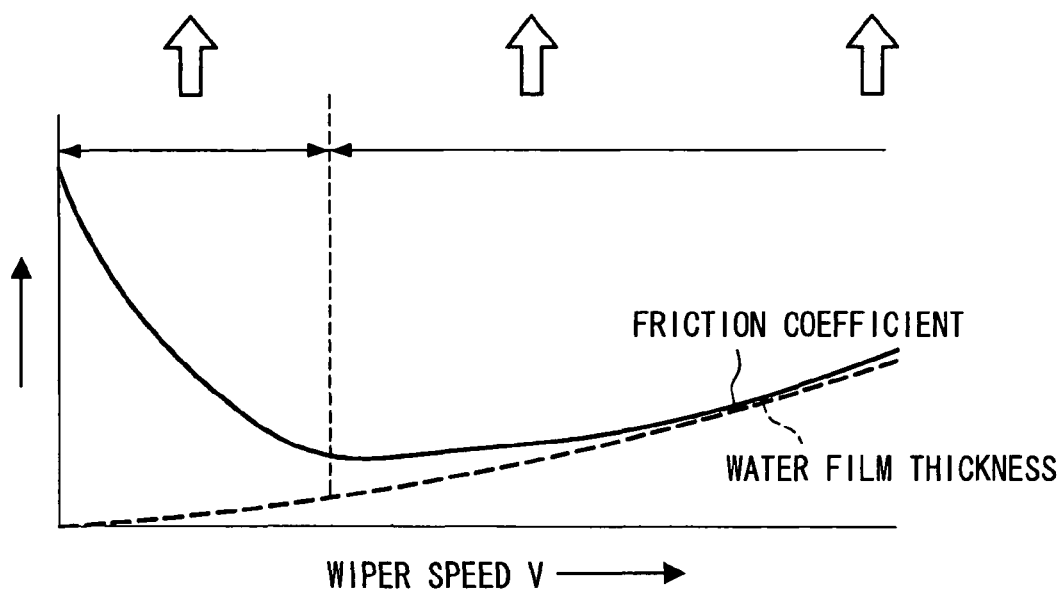

WIPER SYSTEM WITH WASH AND WIPE MODE

CROSS REFERENCE TO RELATED APPLICATION

This application is based on and incorporates herein by reference Japanese Patent Application No. 2006-246842 filed on Sep. 12, 2006.

BACKGROUND OF THE INVENTION

1. Field of the Invention

The present invention relates to a wiper system, which wipers a windshield of a vehicle, and also relates to a method for controlling such a wiper system.

2. Description of Related Art

In general, a wiping speed of wipers of a vehicle wiper system can be changed. For example, in the wiper system, an operational mode of the wipers may be switched to one of a low speed wiping mode (hereinafter, referred to as "LOW mode"), a high speed wiping mode (hereinafter, referred to as "HIGH mode") and an intermittent wiping mode (hereinafter, referred to as "INT mode"). The LOW mode is for wiping at a constant low speed. The HIGH mode is for wiping at a constant high speed. The INT mode is for intermittently executing the wiping movement at the constant low speed. Furthermore, in the INT mode, an intermittent stop time interval can be changed. The switching of the wiping speed is performed by controlling the rotational speed of a wiper motor thorough a pulse width modulation (PWM) control operation.

For example, Japanese Unexamined Patent Publication No. H05-319213 discloses a washer mode, in which reciprocal wiping movement of wipers is automatically repeated several times right after spraying of washer fluid over the windshield to remove dirt, which adheres to the windshield. In this washer mode, normal dirt can be removed within a short period of time with a small quantity of washer fluid. However, it is difficult to remove heavy dirt (e.g., a bird dropping, a smashed bug) within the short period of time with the small quantity of washer fluid. Thus, in order to remove the heavy dirt, the washer fluid needs to be sprayed several times or more, and the wipers need to be reciprocally moved accordingly. As a result, the required time and the required quantity of washer fluid are disadvantageously increased.

SUMMARY OF THE INVENTION

The present invention addresses the above disadvantage. According to one aspect of the present invention, there is provided a wiper system for a vehicle, including a wiper, a washer fluid spraying means, a switching means and a control means. The wiper reciprocally wipes a windshield of the vehicle. The washer fluid spraying means is for spraying washer fluid over the windshield. The switching means is for switching an operational mode of the wiper and of the washer fluid spraying means among a plurality of operational modes. The plurality of operational modes includes a low speed wiping mode, a high speed wiping mode and a wash and wipe mode. In the low speed wiping mode, reciprocal wiping movement of the wiper is executed to wipe the windshield at a first wiping speed without spraying the washer fluid from the washer fluid spraying means. In the high speed wiping mode, reciprocal wiping movement of the wiper is executed to wipe the windshield at a second wiping speed that is higher than the first wiping speed without spraying the washer fluid from the washer fluid spraying means. In the wash and wipe mode, the washer fluid is sprayed from the washer fluid spraying means over the windshield of the vehicle, and reciprocal wiping movement of the wiper is executed a plurality of times to wipe the windshield. A wiping speed of the wiper in the wash and wipe mode in at least one of a running state and a stopped state of the vehicle is set to be lower than the first wiping speed of the wiper that is set for the low speed wiping mode. The control means is for controlling a wiping speed of the wiper and a washer fluid spraying operation of the washer fluid spraying means based on a switched one of the plurality of wiping modes, which is switched thorough the switching means.

According to another aspect of the present invention, there is provided a method for controlling a wiper system including a wiper and a washer fluid spraying means for spraying washer fluid. According to the method, a switching command signal is outputted from a switching means upon a corresponding operation of the switching means by a user. The switching means is for switching an operational mode of the wiper and of the washer fluid spraying means among a plurality of operational modes. The plurality of operational modes includes a low speed wiping mode, a high speed wiping mode and a wash and wipe mode. In the low speed wiping mode, reciprocal wiping movement of the wiper is executed to wipe the windshield at a first wiping speed without spraying the washer fluid from the washer fluid spraying means. In the high speed wiping mode, reciprocal wiping movement of the wiper is executed to wipe the windshield at a second wiping speed that is higher than the first wiping speed without spraying the washer fluid from the washer fluid spraying means. In the wash and wipe mode, the washer fluid is sprayed from the washer fluid spraying means over the windshield of the vehicle, and reciprocal wiping movement of the wiper is executed a plurality of times to wipe the windshield. A wiping speed of the wiper in the wash and wipe mode in at least one of a running state and a stopped state of the vehicle is set to be lower than the first wiping speed of the wiper that is set for the low speed wiping mode. Then, the wiper and the washer fluid spraying means is controlled based on the switching command signal outputted from the switching means to implement a corresponding one of the plurality of operational modes.

BRIEF DESCRIPTION OF THE DRAWINGS

The invention, together with additional objectives, features and advantages thereof, will be best understood from the following description, the appended claims and the accompanying drawings in which:

FIG. 2A to 2C are descriptive diagrams showing various operational states of a wiper that wipes a front glass of a vehicle; and FIG. 2D is a diagram showing a relationship of a friction coefficient and a water film thickness relative to a wiping speed of the wiper in connection with FIGS. 2A to 2C.

DETAILED DESCRIPTION OF THE INVENTION

Figure 1:
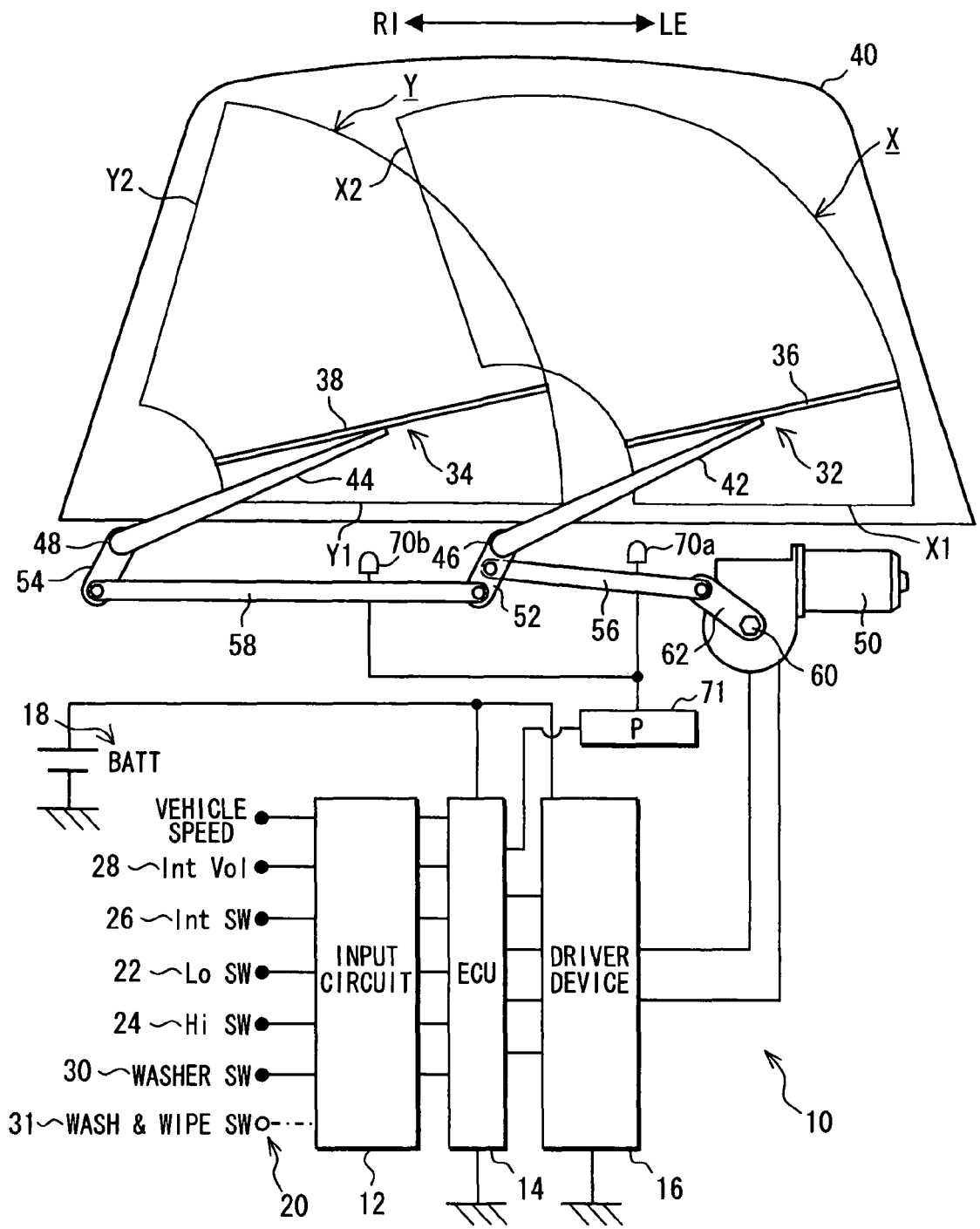
FIG. 1 is a descriptive view of a wiper system according to an embodiment of the present invention.

An embodiment of the present invention will be described with reference to the accompanying drawings.

FIG. 1 shows a wiper system 10 of a vehicle according to an embodiment of the present invention. In FIG. 1, a left direction of the vehicle is indicated with an arrow LE, and a right direction of the vehicle is indicated with an arrow RI.

With reference to FIG. 1, in the wiper system 10, when a user (a vehicle driver) operates a wiper switch (serving as a switching means) 20 to select a desired operational mode, a corresponding input signal (a corresponding switching command signal) is supplied to an electronic control unit (ECU) 14 through an input circuit 12. A driver device 16 is controlled by the ECU 14 to implement the desired operational mode. In this way, for example, a drive voltage, which drives wipers 32, 34, is controlled. Specifically, for example, a rotational speed of a wiper motor 50 (a wiping speed of the wipers 32, 34), a rotating timing of the wiper motor 50 (continuous wiping movement or intermittent wiping movement of the wipers 32, 34) and a spraying operation of washer fluid through washer nozzles 70a, 70b are controlled by the ECU 14. The washer fluid is reserved in a reservoir tank (not shown) and is pumped by a motor pump 71 to spray the washer fluid over a front glass (a windshield) 40 through the washer nozzles 70a, 70b. Rotation of the motor pump 71 is controlled by the ECU 14 to implement the spraying operation of the washer fluid. Electric power is supplied from a battery (BATT) 18, which is installed on the vehicle.

Furthermore, in the vehicle, the front glass 40 is provided as an example of the windshield, and the wipers 32, 34 of the wiper system 10 reciprocally wipe a surface of the front glass 40. Specifically, in a non-operating period of the wiper system 10, a wiper blade 36 of the wiper 32 is placed in an front passenger seat side of the front glass 40, and a wiper blade 38 of the wiper 34 is placed in a driver seat side of the front glass 40. The wiper blade 36 is connected to a distal end of an wiper arm 42, and the wiper blade 38 is connected to a distal end of a wiper arm 44. A base end of the wiper arm 42 is connected to a rotatable pivot shaft 46, and a base end of the wiper arm 44 is connected to a rotatable pivot shaft 48.

One end of a swing plate 52 is fixed to the front passenger seat side pivot shaft 46, and one end of a first link rod 56 is pivotably connected to a middle part of the swing plate 52. Furthermore, one end of a swing plate 54 is fixed to the driver seat side pivot shaft 48, and one end of a second link rod 58 is pivotably connected to the other end of the swing plate 54. Also, the other end of the second link rod 58 is pivotably connected to the other end of the swing plate 52, and the other end of the first link rod 56 is pivotably connected to one end of the rotatable plate 62. The other end of the rotatable plate 62 is fixed to a rotatable shaft (output shaft) 60, which is rotated by the wiper motor 50.

Thus, the rotatable plate 62 is rotated by the wiper motor 50 in a single direction about a rotational axis of the rotatable shaft 60. When the rotatable plate 62 is rotated, the first link rod 56 is reciprocally swung within a predetermined range, and the swing plate 52 is reciprocally swung about a rotational axis of the pivot shaft 46 within a predetermined range. The reciprocal swing movement of the swing plate 52 causes the reciprocal swing movement of the second link rod 58 within a predetermined range. Thus, the swing plate 54 is reciprocally swung about a rotational axis of the pivot shaft 48 within a predetermined range.

In this way, each of the wiper blades 36, 38 is reciprocally driven within a corresponding predetermined angular range of the wiper blade 36, 38 through the wiper arm 42, 44 fixed to the corresponding pivot shaft 46, 48, so that each of the wiper blades 36, 38 reciprocally wipes the front glass 40. In FIG. 1, a range X indicates a wiping pattern (a wiping range of the front glass 40) of the wiper blade 36, and a range Y indicates a wiping pattern (a wiping range of the front glass 40) of the wiper blade 38. Furthermore, in the range X, one end position, which is the lowermost position, is a lower turning position X1 of the wiper blade 36, and the other end position, which is opposite from the one end position, is an upper turning position X2 of the wiper blade 36. Similarly, the range Y has a lower turning position Y1 and an upper turning position Y2.

The wiper switch 20 includes a LOW mode switch 22, a HIGH mode switch 24, an INT mode switch 26, an INT volume (Vol) switch 28 and a washer mode switch 30. The INT volume switch 28 is used to change an intermittent stop (interval) time period in the INT mode. The washer mode switch 30 is used to discharge, i.e., spray the washer fluid through the washer nozzles 70a, 70b and to execute the reciprocal wiping movement of the wipers 32, 34 several times at a predetermined speed. In the wiper system 10, a measurement result (a vehicle speed signal), which is measured with the vehicle speed sensor (not shown), is supplied to the input circuit 12, so that the wiping speed of the wipers 32, 34 can be automatically changed based on the vehicle speed.

Through the switching operation for switching among the mode switches 22, 24, 26, 28, 30, the drive voltage is controlled by the driver device 16 through the input circuit 12 and the ECU 14 to control the reciprocal wiping movement of the wipers 32, 34. Specifically, for example, now, it is assumed that the LOW mode is used as a reference. In such a case, the drive voltage in the HIGH mode is set to be higher than the drive voltage in the LOW mode. Thus, the wiping speed of the wipers 32, 34 becomes relatively high in the HIGH mode. In the INT mode, the drive voltage is set to be the same as the drive voltage in the LOW mode, and the outputting timing of the drive voltage is set at every predetermined time intervals, so that the wiping movement of the wipers 32, 34 becomes intermittent wiping movement.

Furthermore, in the washer mode (wash and wipe mode) of the present embodiment, the wiping speed of the wipers 32, 34 is controlled to be lower than the wiping speed of the wipers 32, 34 in the LOW mode. That is, when the wiper switch 20 is switched to the washer mode switch 30, the drive voltage of the wiper motor 50 is reduced in comparison to the drive voltage of the wiper motor 50 in the LOW mode, so that the rotational speed of the wiper motor 50 is reduced. For example, the drive voltage may be reduced by a PWM control operation or by addition of a resistor(s). In any cases, the wiping speed of the wipers 32, 34 in the washer mode is 20% to 80% of the wiping speed in the LOW mode.

When the wiping speed of the wipers 32, 34 in the washer mode is reduced in comparison to the wiping speed of the wipers 32, 34 in the LOW mode, i.e., when the number of rotations of the wiper motor 50 per unit time (the rotational speed of the motor 50) is reduced, the wiping performance of the wipers 32, 34 for wiping dirt on the front glass 40 is improved for the reasons discussed below with reference to FIGS. 2A to 2D. As shown in FIGS. 2A to 2C, a contact portion, i.e., a wiping portion of each wiper blade 36, 38, which contacts the front glass 40 to wipe the dirt on the front glass 40, is a lip 36A, 38A of a wiper strip of the wiper blade 36, 38.

The dirt, which adheres to the surface (the wiping range) of the front glass 40, can be wiped through use of the washer fluid since the washer fluid reacts with the dirt, which adheres to the surface of the front glass 40, to lift the dirt or to soften the dirt. Thus, after the reaction with the washer fluid, when the surface of the front glass 40 is wiped by the lip 36A, 38A of the wiper blade 36, 38, the dirt, which adheres to the surface of the front glass 40, can be effectively removed from the front glass 40.

That is, when the wiping speed of the wiper 32, 34 is reduced, a reaction time period of the washer fluid with the dirt can be increased. Thus, the dirt (particularly heavy dirt such as a bird dropping, a smashed bug) can be effectively removed from the surface of the front glass 40. Furthermore, as shown in FIGS. 2A to 2D, when the wiping speed of the wiper 32, 34 is relatively low, the lip 36A, 38A can be slid over the surface of the front glass 40 while exerting predetermined friction relative the surface of the front glass 40.

That is, when the wiping speed of the wiper 32, 34 is relatively high, resistance of a water film W, which remains on the surface of the front glass 40, causes lifting of the lip 36A, 38A (see FIG. 2C in comparison to FIGS. 2A and 2B). In such a case, the lip 36A, 38A cannot be slid over the surface of the front glass 40 while maintaining the predetermined friction between the lip 36A, 38A and the surface of the front glass 40. Thus, the lip 36A, 38A may leave the dirt, which is lifted or softened by the washer fluid, on the front glass 40. As shown in FIGS. 2A to 2D, the thickness of the water film W is increased as the wiping speed of the wiper 32, 34 is increased. Thus, when the wiping speed of the wiper 32, 34 is relatively low, the dirt (heavy dirt) on the front glass 40 can be more effectively removed (see FIG. 2A).

When the wiping speed of the wiper 32, 34 is reduced synchronously with the spraying of the washer fluid over the front glass 40 to effectively remove the dirt on the front glass 40, consumption of the washer fluid can be reduced. Particularly, in the washer mode, in order to further reduce the consumption of the washer fluid, it is desirable to spray the washer fluid before the movement of the wiper 32, 34 from the lower turning position X1, Y1 to the upper turning position X2, Y2 (or during the movement of the wiper 32, 34 from the lower turning position X1, Y1 to the upper turning position X2, Y2) or before the movement of the wiper 32, 34 from the upper turning position X2, Y2 to the lower turning position X1, Y1 (or during the movement of the wiper 32, 34 from the upper turning position X2, Y2 to the lower turning position X1, Y1).

For example, the position of the wiper 32, 34 may be sensed based on the position (the rotational position) of the rotatable plate 62, which is connected to the rotatable shaft 60 of the wiper motor 50. Alternatively, the position of the wiper 32, 34 may be sensed based on the control signal, which is outputted from the ECU 14 to the wiper motor 50 (the driver device 16).

Furthermore, the control operation for reducing the wiping speed of the wiper 32, 34 in the washer mode in comparison to the wiping speed of the wiper 32, 34 in the LOW mode may be executed all the time regardless of the stopped state or the running state of the vehicle or may be alternatively executed only in the stopped state of the vehicle. Specifically, only when a parking signal is inputted to the input circuit 12, the wiping speed of the wiper 32, 34 in the washer mode may be controlled and thereby reduced in comparison to the wiping speed of the wiper 32, 34 in the LOW mode.

In this way, the dirt (heavy dirt) on the front glass 40 can be more effectively removed in comparison to the running state of the vehicle. Furthermore, in the case where the washer mode is used in the running state of the vehicle, it is possible to limit hindering of the view of the vehicle driver by the wiper 32, 34.

Furthermore, in the wiper system 10, the wiping speed of the wiper 32, 34 is variable based on the vehicle speed in the running state of the vehicle. Thus, when the mode is switched to the washer mode in the running state of the vehicle, the wiping speed of the wiper 32, 34 may be increased continuously or stepwise based on the vehicle speed. In this way, the dirt (heavy dirt) on the front glass 40 can be effectively removed. Furthermore, even in the case where the washer mode is used in the running state of the vehicle, it is possible to limit hindering of the view of the vehicle driver by the wiper 32, 34.

In addition, in the case where the washer mode is used in the running state of the vehicle, even when the wiping speed of the wiper 32, 34 is increased continuously or stepwise, the wiping speed of the wiper 32, 34 should not exceed the wiping speed of the wiper 32, 34 in the LOW mode (up to 80% of the wiping speed of the wiper 32, 34 in the LOW mode).

In the above embodiment, the washer mode switch 30 is used to implement the wash and wipe mode of the present invention, in which the wiping speed of the wipers 32, 34 is controlled to be lower than the wiping speed of the wipers 32, 34 in the LOW mode. Besides using the washer mode switch 30 for implementing the wipe and wash mode (special washer mode for removing the heavy dirt), the washer mode switch 30 may be used to implement the regular normal washer mode, in which the wiping speed of the wipers 32, 34 is controlled to be the same as the wiping speed of the wipers 32, 34 in the LOW mode to remove light dirt. The above use of the washer mode switch 30 may be implemented, as follows. For example, the washer mode switch 30 may be implemented as a pull type lever switch. When the washer mode switch 30 is pulled for a short period of time, the wipe and wash mode may be carried out. In contrast, when the washer mode switch 30 is pulled for a long period of time, the normal washer mode may be carried out.

Furthermore, in the above embodiment, the washer mode switch 30 is used to implement the wash and wipe mode of the present invention, in which the wiping speed of the wipers 32, 34 is controlled to be lower than the wiping speed of the wipers 32, 34 in the LOW mode. Alternatively, as shown in FIG. 1 with a dot-dash line, a wash and wipe mode switch 31 may be provided separately from the wash mode switch 30. When the driver turns on the wash and wipe mode switch 31, the wiping speed of the wipers 32, 34 is controlled to be lower than the wiping speed of the wipers 32, 34 in the LOW mode. Then, when the driver turns on the washer mode switch 30, the wiping speed of the wipers 32, 34 is controlled to be the same as the wiping speed of the wipers 32, 34 in the LOW mode to implement the normal washer mode.

Additional advantages and modifications will readily occur to those skilled in the art. The invention in its broader terms is therefore not limited to the specific details, representative apparatus, and illustrative examples shown and described.

What is claimed is:

1. A wiper system for a vehicle, comprising:
   a wiper that reciprocally wipes a windshield of the vehicle;
   a washer fluid spraying means for spraying washer fluid over the windshield;
   a switching means for switching an operational mode of the wiper and of the washer fluid spraying means among a plurality of operational modes, which include:
   a low speed wiping mode, in which reciprocal wiping movement of the wiper is executed to wipe the windshield at a first wiping speed without spraying the washer fluid from the washer fluid spraying means;
   a high speed wiping mode, in which reciprocal wiping movement of the wiper is executed to wipe the windshield at a second wiping speed that is higher than the first wiping speed without spraying the washer fluid from the washer fluid spraying means; and
   a wash and wipe mode, in which the washer fluid is sprayed from the washer fluid spraying means over the windshield of the vehicle, and reciprocal wiping movement of the wiper is executed a plurality of times to wipe the windshield, wherein a wiping speed of the wiper in the wash and wipe mode in at least one of a running state and a stopped state of the vehicle is set to be lower than the first wiping speed of the wiper that is set for the low speed wiping mode; and a control means for controlling a wiping speed of the wiper and a washer fluid spraying operation of the washer fluid spraying means based on a switched one of the plurality of wiping modes, which is switched thorough the switching means.

2. The wiper system according to claim 1, wherein the control means execute the reciprocal wiping movement of the wiper after spraying of the washer fluid from the washer fluid spraying means in the wash and wipe mode.

3. The wiper system according to claim 1, wherein the control means controls the washer fluid spraying means to execute spraying of the washer fluid in one of:

before movement of the wiper from a lower turning position to an upper turning position; and during the movement of the wiper from the lower turning position to the upper turning position.

4. The wiper system according to claim 1, wherein the control means controls the washer fluid spraying means to execute spraying of the washer fluid in one of:

before movement of the wiper from an upper turning position to a lower turning position; and during the movement of the wiper from the upper turning position to the lower turning position.

5. The wiper system according to claim 1, wherein when the vehicle is stopped, the control means sets the wiping speed of the wiper in the wash and wipe mode to be lower than the first wiping speed of the wiper that is set for the low speed wiping mode.

6. The wiper system according to claim 1, wherein the control means increases the wiping speed of the wiper in the wash and wipe mode when a speed of the vehicle is increased.

7. The wiper system according to claim 1, wherein the control means sets the wiping speed of the wiper in the wash and wipe mode to be 20% to 80% of the first wiping speed of the wiper that is set for the low speed wiping mode.

8. The wiper system according to claim 1, wherein the plurality of operational modes further includes a normal washer mode, in which washer fluid is sprayed from the washer fluid spraying means over the windshield of the vehicle, and reciprocal wiping movement of the wiper is executed a plurality of times to wipe the windshield, wherein a wiping speed of the wiper in the normal washer mode is set to be the same as the first wiping speed of the wiper that is set for the low speed wiping mode.

9. The wiper system according to claim 8, wherein the control means execute the reciprocal wiping movement of the wiper after spraying of the washer fluid from the washer fluid spraying means in the normal washer mode.

* * * * *